United States Patent [19]

Tilman et al.

[11] Patent Number: 5,558,613

[45] Date of Patent: Sep. 24, 1996

[54] METHOD FOR REDUCING THE VARIANCE IN THE FORCES NEEDED TO OPEN RECLOSABLE PLASTIC BAGS FROM WITHIN AND FROM WITHOUT

[75] Inventors: Paul A. Tilman, New City; Richmond M. Scott, Pleasantville; Zdenek Machacek, Nanuet, all of N.Y.

[73] Assignee: Minigrap, Inc., Orangeburg, N.Y.

[21] Appl. No.: 337,569

[22] Filed: Nov. 10, 1994

Related U.S. Application Data

[63] Continuation-in-part of Ser. No. 174,273, Dec. 28, 1993, Pat. No. 5,368,394, and Ser. No. 249,144, May 25, 1994, Pat. No. 5,462,360.

[51] Int. Cl.$^6$ .......................... B65D 33/16; B65D 33/24; B31B 3/72
[52] U.S. Cl. .......................... 493/214; 493/212; 493/215; 493/213
[58] Field of Search .......................... 493/189, 193, 493/203, 206, 211, 213, 214, 215, 212; 156/244, 543, 309.6, 583.1

[56] References Cited

U.S. PATENT DOCUMENTS

| | | | |
|---|---|---|---|
| 3,323,707 | 6/1967 | King | 229/66 |
| 3,839,128 | 10/1974 | Arai | 493/214 |
| 3,948,705 | 4/1976 | Ausnit | 156/73.4 |
| 4,430,070 | 2/1984 | Ausnit | 493/215 |
| 4,528,224 | 7/1985 | Ausnit | 428/36 |
| 4,555,293 | 11/1985 | French | 156/308.4 |
| 4,561,108 | 12/1985 | Kamp | 383/63 |
| 4,601,694 | 7/1986 | Ausnit | 493/381 |
| 4,673,383 | 6/1987 | Bentsen | 493/381 |
| 4,682,366 | 7/1987 | Ausnit | 383/65 |
| 4,691,372 | 9/1987 | Van Erden | 383/63 |
| 4,703,518 | 10/1987 | Ausnit | 383/63 |
| 4,731,911 | 3/1988 | Gould | 24/587 |
| 4,736,496 | 4/1988 | Fisher | 24/587 |
| 4,807,300 | 2/1989 | Ausnit | 383/65 |
| 4,817,188 | 3/1989 | Van Erden | 383/63 |
| 4,822,539 | 4/1989 | Tillman | 264/40.4 |
| 4,892,414 | 1/1990 | Ausnit | 383/63 |
| 4,964,739 | 10/1990 | Branson | 383/5 |
| 4,971,454 | 11/1990 | Branson | 493/214 |
| 4,985,192 | 1/1991 | Roeder | 264/177.1 |
| 5,004,356 | 4/1991 | Matsui | 383/63 |
| 5,012,561 | 5/1991 | Porchia | 24/576 |
| 5,067,822 | 11/1991 | Wirth | 383/61 |
| 5,198,055 | 3/1993 | Wirth | 156/66 |
| 5,216,787 | 6/1993 | Custer | 24/587 |
| 5,242,516 | 9/1993 | Custer | 156/66 |
| 5,279,693 | 1/1994 | Robinson | 156/272.8 |
| 5,284,002 | 2/1994 | Fowler | 493/206 |
| 5,364,127 | 8/1994 | Bruno | 493/194 |
| 5,366,294 | 11/1994 | Wirth | 383/61 |
| 5,368,394 | 11/1994 | Scott | 383/63 |
| 5,400,568 | 3/1995 | Kanemitsu | 53/412 |
| 5,462,360 | 10/1995 | Tillman | 383/63 |
| 5,470,156 | 11/1995 | May | 383/210 |
| 5,489,252 | 2/1996 | May | 383/210 |
| 5,492,411 | 2/1996 | May | 493/213 |

*Primary Examiner*—Jack W. Lavinder
*Assistant Examiner*—Christopher W. Day
*Attorney, Agent, or Firm*—Kane, Dalsimer, Sullivan, Kurucz, Levy, Eisele and Richard, LLP

[57] ABSTRACT

A method for substantially reducing the variance in results obtained in pull tests on reclosable plastic bags, wherein the forces needed to open the bags from within and from without are measured and compared, by controlling the attachment point of the bag wall to the base of the zipper profile requires the use of selectively placed preferential seal areas. These seal areas are provided by disposing an interlayer between each profile and its respective bag wall. The interlayers include a strip of material having a lower melting point than those of the profiles and the bag walls and having a preselected width greater than any possible lateral displacement, or "float", of the profiles that may occur in the sealing apparatus. Where the strip does not take up the entire width of the interlayer, it has a preselected, constant width and runs parallel to the zipper profiles. The lower melting point of the material of the strip, and the width of the strip, ensure that the seal location on the profiles remains fixed.

9 Claims, 6 Drawing Sheets

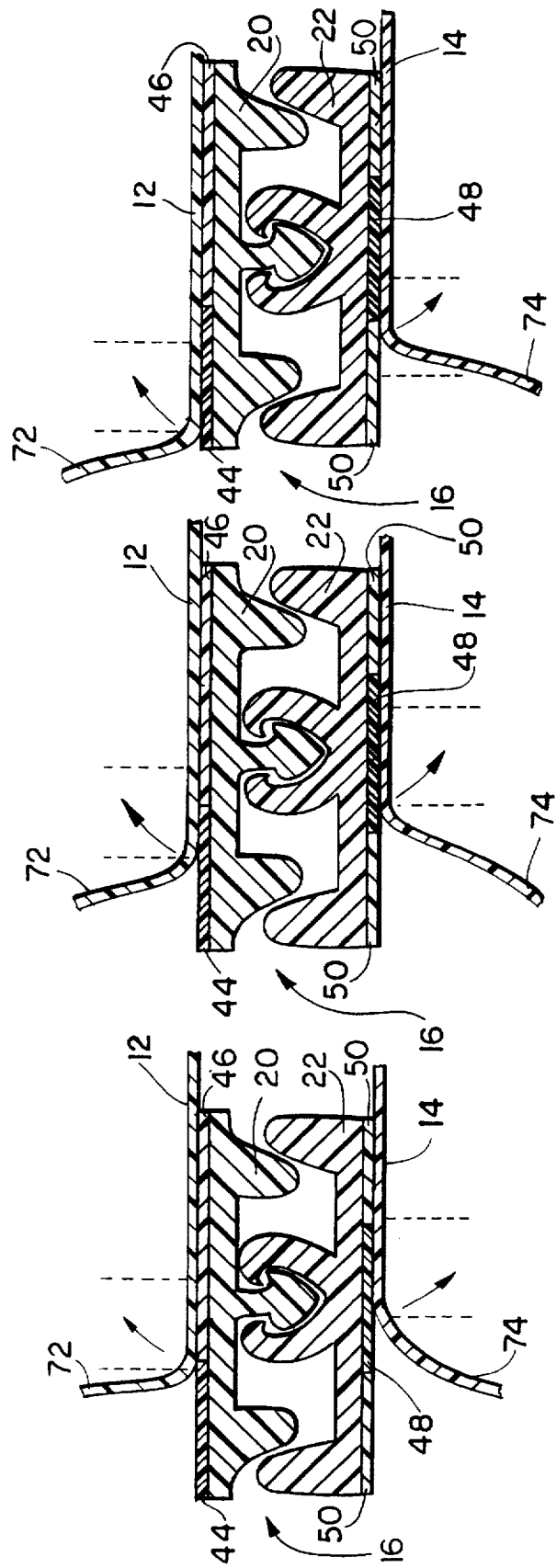

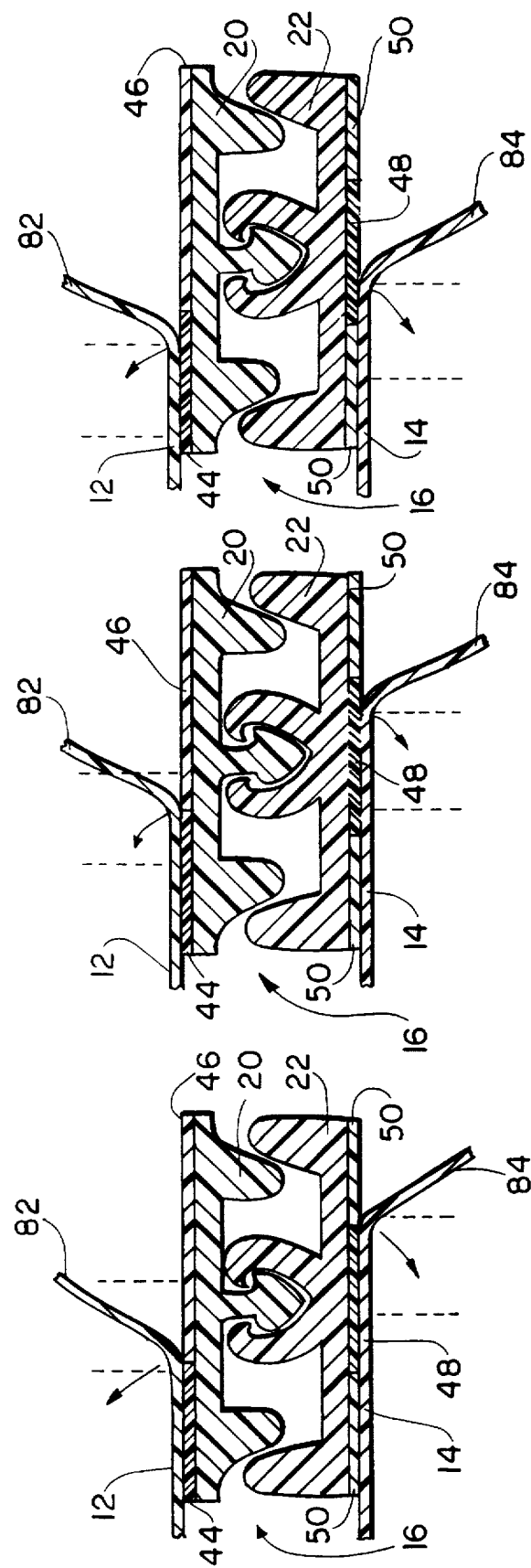

METHOD FOR REDUCING THE VARIANCE IN THE FORCES NEEDED TO OPEN RECLOSABLE PLASTIC BAGS FROM WITHIN AND FROM WITHOUT

CROSS-REFERENCE TO RELATED APPLICATIONS

This is a continuation-in-part (CIP) of U.S. patent application Ser. No. 08/174,273, filed Dec. 28, 1993, now U.S. Pat. No. 5,368,394, and of U.S. patent application Ser. No. 08/249,144, filed May 25, 1994, now U.S. Pat. No. 5,462,360.

BACKGROUND OF THE INVENTION

1. Field of the Invention

This invention pertains to the art of reclosable plastic bags having extruded zippers, and more particularly to a reclosable bag having fastener profiles including wedge-shaped stops, which facilitate the joining attachment of the fastener profiles and which determine the amount of pull force required to open the bags. The fastener profiles are further of a design which makes inadvertent opening of the bags less likely.

The present invention also relates to reclosable plastic bags requiring a greater pull force to be opened from within than from without, and to a method for substantially reducing the variance in the forces required to open such bags from within and from without, as well as the consequent variability in the ratio between those forces.

2. Description of the Prior Art

Reclosable bags used, for example, for storing household foodstuffs are typically made of polyethylene. As shown in U.S. Pat. No. 3,416,199 to Imamura commonly assigned with the present invention, a reclosable bag may be formed of two opposed walls equipped at the mouth with fastener profiles. These profiles include a male profile attached to one wall and a female profile on the other wall. The profiles are shaped so that, when they are aligned and pressed together into an engaging relationship, they form a continuous closure for the bag. The bag may be opened by pulling the walls apart thereby separating the profiles. Various geometric shapes and arrangements for such profiles are shown in U.S. Pat. Nos. Re. 28,969; 3,323,707; 4,212,337; 4,363,345; 4,561,108; and 4,812,056. In addition, U.S. Pat. Nos. 4,736, 496 and 5,012,561 disclose reclosable bags with profiles and internal ribs adjacent to the profiles. U.S. Pat. No. 4,822,539 discloses a reclosable bag with interlocking profiles, internal guiding ribs disposed adjacent to the profiles, and stabilizing beams disposed on the outside surface of the bag wall. U.S. Pat. No. 3,338,285 discloses a reclosable bag having several parallel interlocking male and female profiles. In general, the profiles must be such as to provide relatively high resistance to opening from inside the bag while rendering the bag relatively easy to open from the outside.

For the zipper to function properly, it is important that the zipper components (i.e. the profiles and any wedges, beams, ribs or the like provided to enhance the operation of the profiles) maintain their alignment. The problem of maintaining the alignment of the components of the zipper is exacerbated where the zipper is in string or strip form to be heat sealed to a film material from which the body of the bag is to be formed, since the heat necessary to fuse the zipper strip to the film could distort the profiles or a zipper component. Heretofore, the problem has been avoided by adding webs to the zipper strip to separate the profiles (and components) from the point of attachment to the film. In U.S. Pat. No. 4,673,383 a zipper strip is disclosed having fusible ribs on its undersurface to minimize the heat to which the zipper is subjected. In U.S. Pat. Nos. 4,691,372; 4,731, 911; and 4,817,188, an adhesive layer is provided on the base of the profile portion of the strip.

SUMMARY OF THE INVENTION

In view of the above, an objective of the present invention is to provide a reclosable bag with improved closure means resistant to inadvertent opening.

Another object is to provide such closure means in the form of a zipper strip which may be heat-sealed to an associated film without distorting the zipper profiles or any of the components of the zipper.

Other objectives and advantages of the invention will become apparent from the following description. A reclosable bag constructed in accordance with this invention includes a front wall and a rear wall joined to form an enclosure with a mouth defined by wall edges at the top of the bag and male and female profile means having male and female members for selectively opening and closing said mouth. Stabilizer wedges are provided on each of the male and female profile means. Specifically, a stabilizer wedge is provided on each side of the male and female members on the male and female profile means. The wedges keep the zipper parallel during the application of the zipper to the film from which the bag is made and have a stabilizing effect during the attachment process. Further, the wedge action controls the force required to open the bag, and substantially increases the inside resistance to opening pressure from the product within the bag. Finally, the stabilizer provides the zipper as a whole with a wide-track feel for the benefit of the consumer.

The profiles are provided on zipper strips heat-sealed to the front and rear walls of the bag. To facilitate the heat-sealing, a layer of a material having a lower melting temperature than the zipper strips and the bag material is provided underlying at least a portion of the zipper strip width so that the zipper may be heat-sealed to the bag walls at a temperature sufficiently low to prevent distortion of the profiles or wedges, or of the bag material. The lower-melting-point material may underlie only a portion of the zipper width, so that a hinged connection is provided between the zipper strip and bag wall. The lower-melting-point material may, for example, be a high ethylene-vinyl acetate (EVA) material, a high melt index (M.I.) material, a thermoplastic olefin (TPO) copolymer or polypropylene-ethylene copolymer, or an ethylene methyl acrylate (EMA) copolymer.

The use of a lower-melting-point material under only a portion of the zipper may enable the manufacturer to fix the position of the seal of the zipper strip to the bag wall in spite of any lateral shifting, or "float", thereof permitted by the equipment used to manufacture the bags. Such is accomplished by making the lower-melting-point material in a strip wider than the "float" which may occur in the equipment. In that situation, the lower-melting-point material will be melted by the sealing head, regardless of any shift laterally relative thereto, and will ensure a seal at a constant position on the profile.

The present invention will now be described more completely with frequent reference being made to the drawings identified hereinbelow.

BRIEF DESCRIPTION OF THE DRAWINGS

FIGS. 8A, 8B and 8C show pull test conditions for measuring the force required to open plastic bags from without; and FIGS. 9A, 9B and 9C show pull test conditions for measuring the force required to open plastic bags from within.

DETAILED DESCRIPTION OF THE PREFERRED EMBODIMENT

Figure 2:
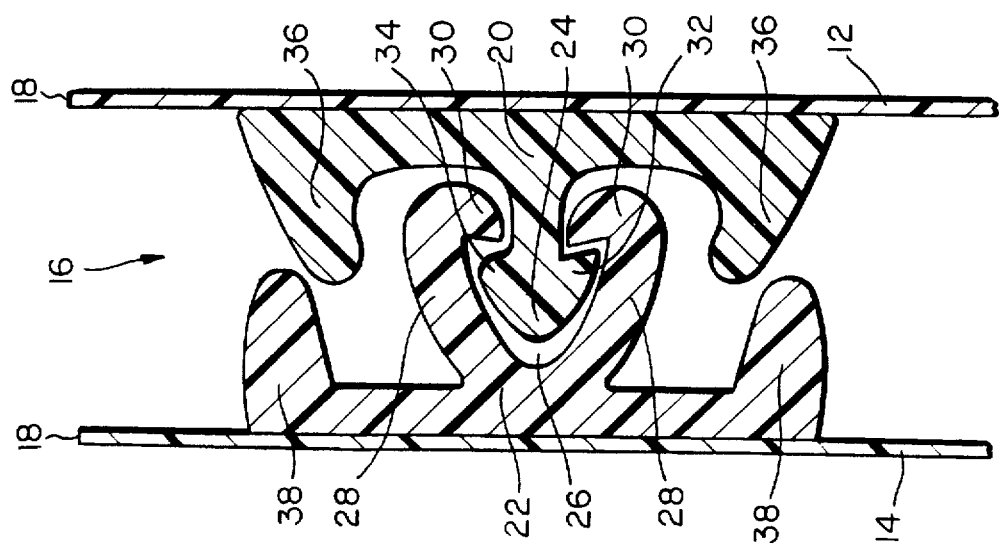
FIG. 2 shows an enlarged side sectional view of the bag opening.
Figure 1:
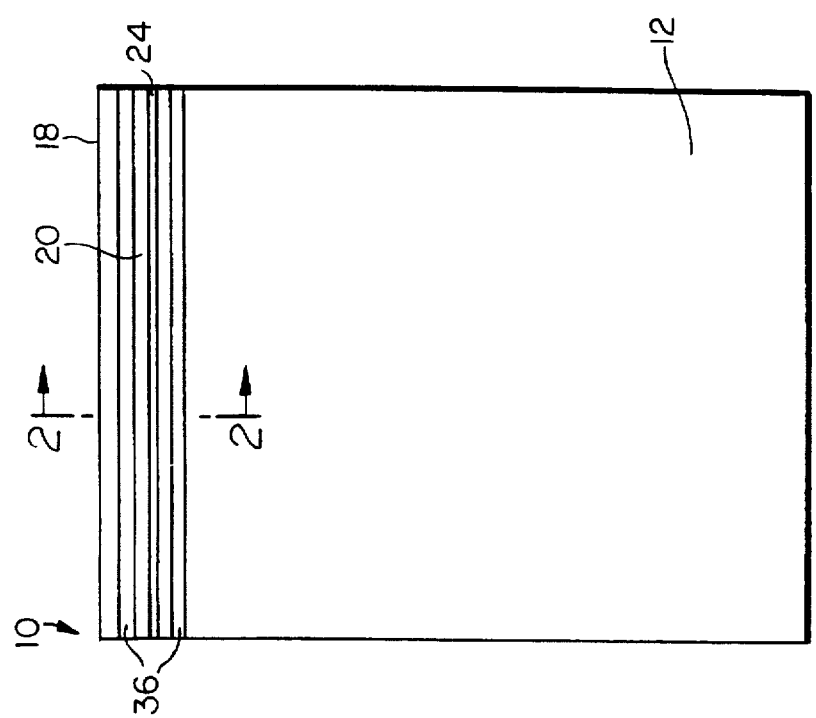
FIG. 1 shows a plan view of a reclosable bag constructed in accordance with the present invention.

Referring now to the drawings, and specifically to FIGS. 1 and 2, a reclosable bag 10 constructed in accordance with this invention includes front and rear walls 12,14 seamed along three edges thereby forming an enclosure with an opening or mouth 16 along the top or fourth edge 18. The bag 10 is preferably made of a thermoplastic material such as polyethylene by extrusion. Attached to internal faces, walls 12 and 14 are male and female profiles 20,22 respectively, which extend continuously from side to side of the bag. The profile serves to close the bag opening 16 when they are interlocked as shown in FIG. 2.

The male profile 20 includes an asymmetric arrowhead 24 which locks into a channel 26 formed by two inwardly curved members 28 having inwardly pointing stubs 30. The asymmetric arrowhead 24 is so called because its two barbs are not mirror images of one another. Barb 32 has an acute edge, while barb 34 has a rounded edge. Barb 34 is closer to the mouth 16 of the bag 10 than barb 32.

The male profile 20 has two stabilizer wedges 36, which are on each side of the asymmetric arrowhead 24 and are parallel thereto across the width of the bag 10. The stabilizer wedges 36 are inclined toward one another and toward asymmetric arrowhead 24.

In like manner, the female profile 22 has two stabilizer wedges 38, which are on each side of the inwardly curved members 28 and are parallel thereto across the width of the bag 10. The stabilizer wedges 38 are inclined away from one another, or, at least, have surfaces facing the inwardly curved members 28 which are inclined away from one another.

When the male and female profiles 20,22 are interengaged as shown in FIG. 2, stabilizer wedges 36 protrude to some preselected degree into the spaces between the stabilizer wedges 38 and the inwardly curved members 28 on the female profile 22.

Figure 3:
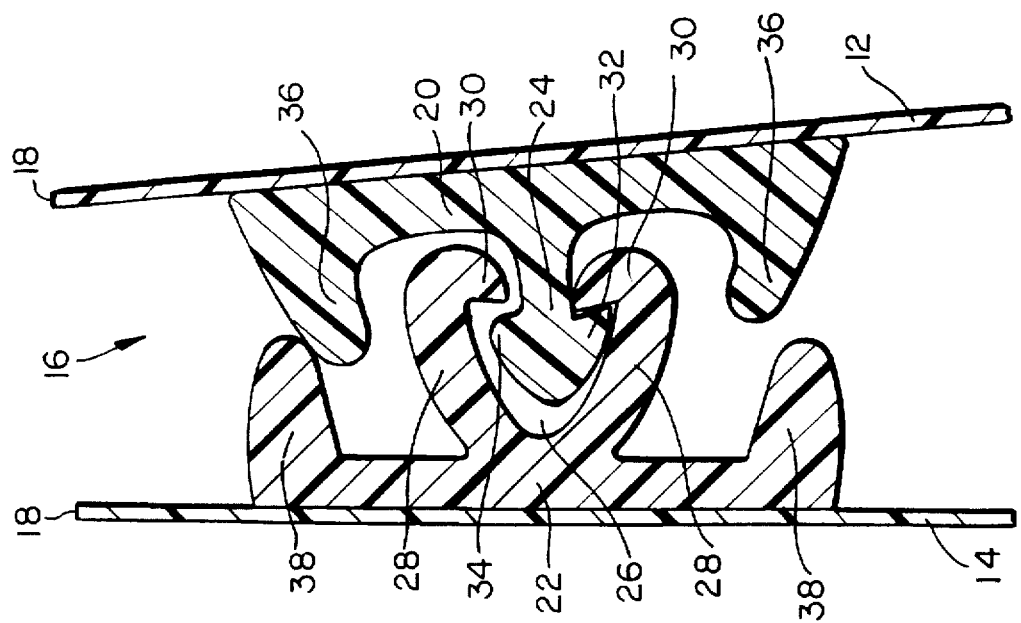
FIG. 3 shows an enlarged side sectional view, analogous to that presented in FIG. 2, of the bag being opened from the outside.

Bag 10 is normally opened by gripping edges 18 on the outside of the bag 10 and pulling them apart. In response to such action the lower stabilizer wedges 36,38, which are toward the inside of the bag 10, as shown in FIG. 3, abut against one another. This braces the male profile 20 against the female profile 22, and allows the rounded barb 34 of the asymmetric arrowhead 24 to glide past its adjacent stub 30 to open the bag 10. The force required to open the bag 10 may be preselected by appropriately choosing the angles at which the surfaces of stabilizer wedges 36,38 contact one another.

Figure 4:
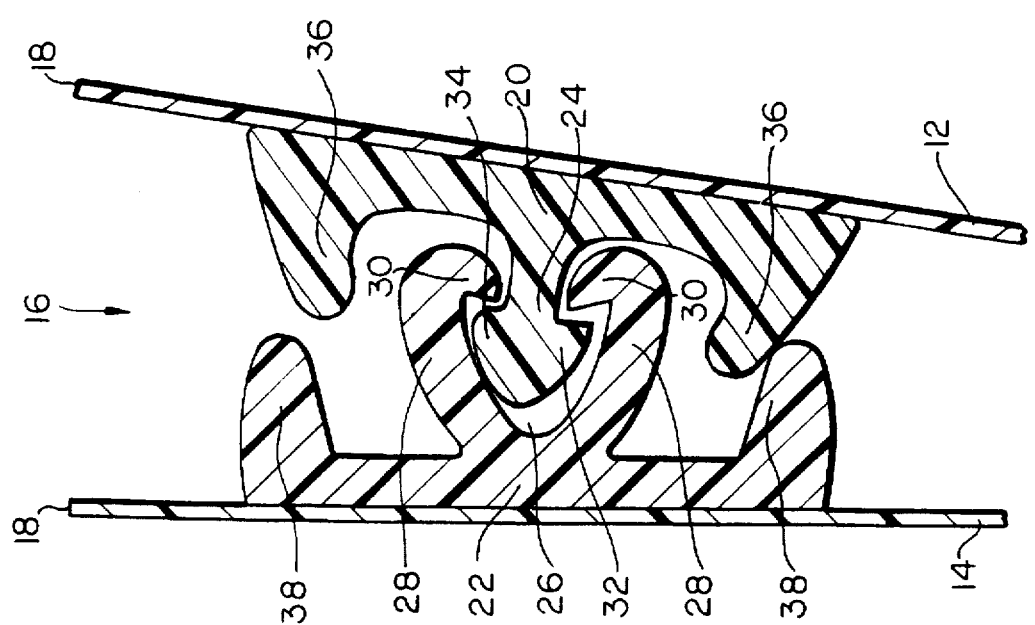
FIG. 4 shows another enlarged side sectional view, analogous to that presented in FIG. 2, of the bag being opened from the inside.

The situation that would arise from an opening force from within the bag 10 is shown in FIG. 4. In response to such action, the upper stabilizer wedges 36,38, which are toward the outside of the bag 10, as shown in FIG. 4, abut against one another. This again braces the male profile 20 against the female profile 22, and hooks the acute barb 32 of the asymmetric arrowhead 24 behind its adjacent stub 30 inhibiting the opening of the bag 10. The force required to open the bag 10 from within may be preselected by appropriately choosing the angles at which the surfaces of stabilizer wedges 36,38 contact one another.

Bag 10 may be generated unitarily, for example, by extruding the walls 12,14, and the profiles 20,22 integrally. Alternatively, the closures may be extruded separately, and then may be bonded to sheets of bag forming material at some stage in the bag forming operation.

Figure 5:
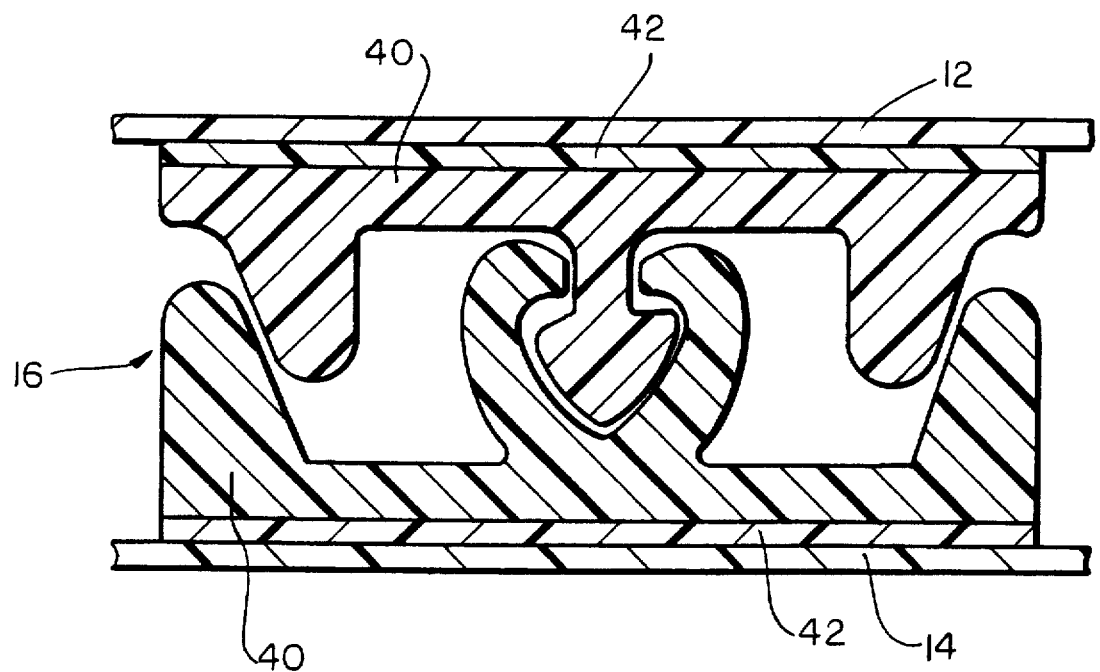
FIG. 5 shows an enlarged side sectional view of an alternative embodiment of the bag of the present invention wherein an interlayer is utilized between the bag walls and profile strips.
Figure 6:
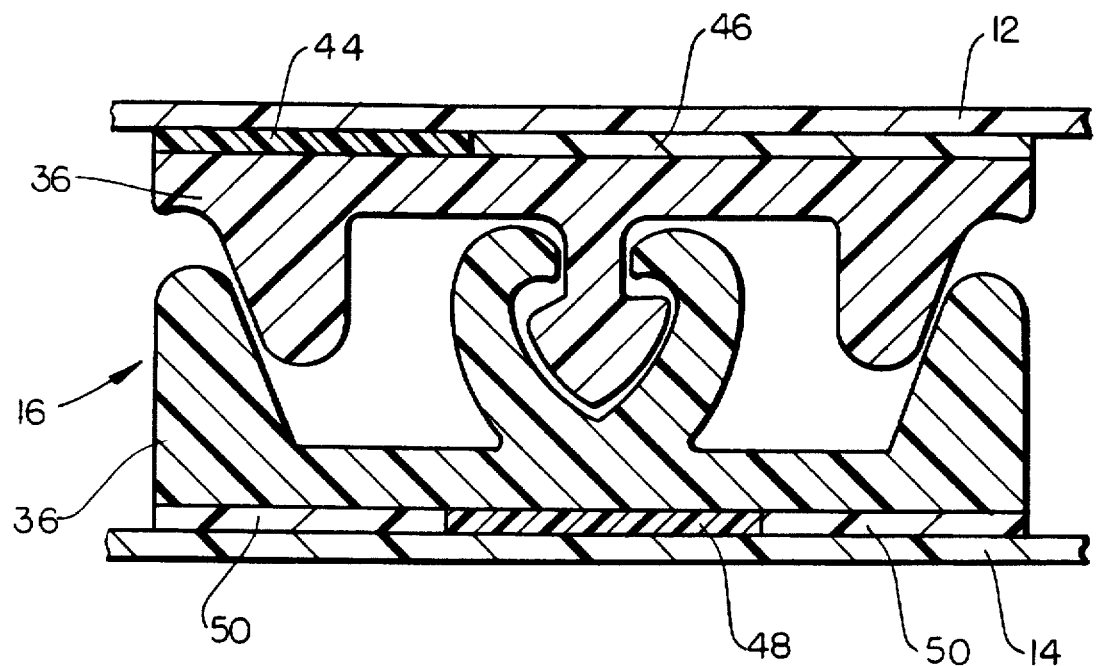
FIG. 6 shows an enlarged side sectional view of a further embodiment of the bag of the present invention.

The construction of the zippers shown in FIGS. 5 and 6 is the same as that described above except that in each case an intermediate layer 42 is provided between the base 40 of the profile strips and the bag walls 12,14. The intermediate layer 42 comprises, at least in part, a material having a lower melt temperature than the base of the profile strip and the bag material. For example, the material of the intermediate layer 42 may have a higher EVA content or a higher melt index. Thus, in FIG. 5, the zipper and bag material may be formed of a relatively low melt index material, such as a conventional polyethylene, whereas the intermediate layer 42 may be formed of a high EVA content polyethylene, or may be provided of a relatively high melt index polyethylene material such as sold by Quantum Chemical Co. under the tradename NATR 201, the melt index of the latter being 6 as compared with a melt index of 2 for the conventional polyethylene resin from which the zipper is formed. Those of ordinary skill in the art understand the melt index (M.I.) of a thermoplastic material to be the amount, in grams, which can be forced through an orifice of 0.0825 inch diameter when subjected to a force of 2160 grams in ten minutes at a temperature of 190° C. under the procedure set forth in ASTM Standard D-1238.

Those of ordinary skill in the art will also recognize that the inclusion of intermediate layer 42 having a lower melting point than the base 40 of the profile strips and the bag walls 12,14 may permit the profile strips to be bonded to the bag walls 12,14 at a lower temperature than that which would be required to bond them directly to one another. As a consequence, distortion of the profile strips, caused by exposure to temperatures near the melting point of the polyethylene from which they may be extruded, as well as a thinning of the bags walls 12,14 in the areas where the bonding is being carried out, may be avoided through the use of a lower-melting-point intermediate layer of this type.

In the embodiment of FIG. 6, on the male profile side of the zipper the lower-melting-point material 44 of the interlayer is provided behind only a portion of the zipper carrying the male profile. The lower-melting-point material 44 extends downwardly (i.e. toward the bag bottom) from the top edge of the zipper substantially behind the top wedge 36. The lower portion 46 of the interlayer (i.e. behind the male profile and bottom wedge) is formed of a non-seal material (i.e. a material that will not fuse to the bag wall at the temperature at which the top portion 44 of the interlayer is fused to the bag wall). As a result the male profile strip will be hinged to the bag wall to enhance the resistance to opening of the bag from within the bag in the manner described in U.S. Pat. No. 4,430,070. The lower-melting-point material 48 of the female profile strip is disposed behind the female profile and strips 50 formed of non-seal material are provided above and below the female profile as shown. As above, the lower-melting-point material 44,48 may be a high EVA material or a high melt index material.

In general, interlayers of the variety shown in FIG. 6 may be used to overcome the variability in the forces required to open reclosable plastic bags caused by the floating of the zipper profiles laterally with respect to the sealing heads in the apparatus commonly used to bond the zipper profiles to plastic sheet material.

Figure 7:
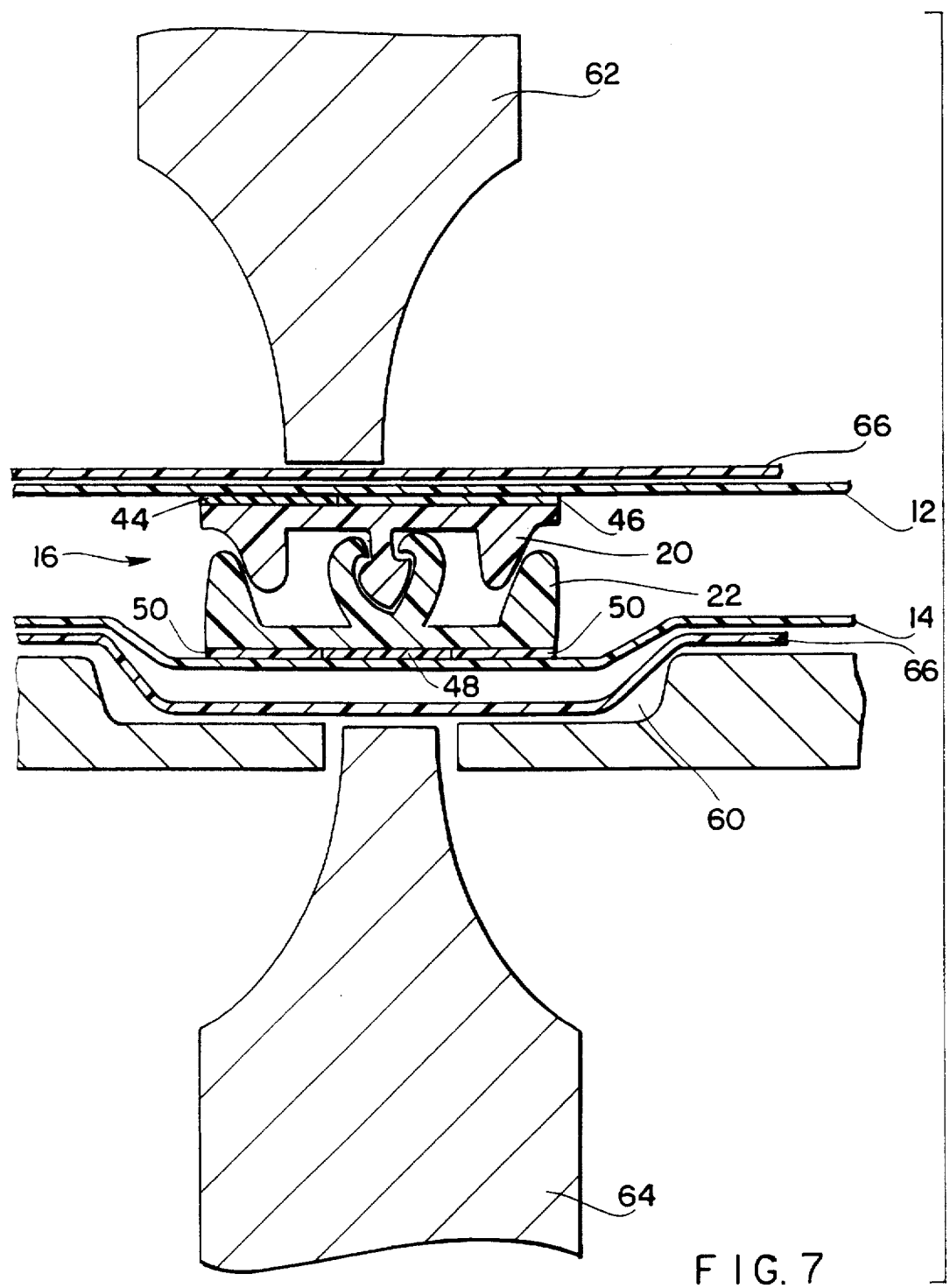
FIG. 7 is a cross-sectional view of an apparatus used to seal zipper profiles to plastic sheet material.

Reference is made to FIG. 7, which shows, in part, a pair of interlocked zipper profiles like those shown in FIG. 6, although it should be understood that the discussion to follow is applicable to zipper profiles of any configuration.

When being bonded to bag walls 12,14, the interlocked male profile 20 and female profile 22 shown in FIG. 6 are passed along a channel 60 between two sealing heads 62,64. It will be recognized that FIG. 7 is a cross-sectional view of the apparatus used to effect the bonding, and that the profiles 20,22 and bag walls 12,14 are moving either toward or away from the observer between the sealing heads 62,64. Slippery, heat-resistant belts 66, of a material such as TEFLON®, are disposed and run between sealing head 62 and bag wall 12, and between sealing head 64 and bag wall 14 to ensure that the bag walls 12,14 will slip freely by the sealing heads 62,64 at the high speeds at which the sealing apparatus operates, and that any material of the bag walls 12,14 that may melt will not accumulate on the sealing heads 62,64.

Because channel 60 must be wide enough to accommodate the female profile 22, bag wall 14 and a TEFLON® belt 66, as shown in FIG. 7, there will inevitably be some lateral shifting, or "float", of the profiles 20,22 within the channel 60, as the profiles 20,22 move longitudinally therein between the sealing heads 62,64. As a consequence, the sealing positions of bag wall 12 to male profile 20, and of bag wall 14 to female profile 22 in the prior art tend to wander laterally across the male and female profiles 20,22. As a consequence of this wandering, the forces required to open the bags from within and from without tend to be nonuniform. This is particularly true where only a portion of the width of the profiles 20,22 is to be bonded to their respective bag walls 12,14, as was the case in FIG. 6.

However, the present invention provides a method for overcoming this variability, which is often unacceptable to the end users of the bags being produced. The key is to provide lower-melting-point material 44,48 in the regions where a bond is desired in a width such that, despite any lateral shifting, or "float", of the profiles 20,22 within the channel 60, a portion of the lower-melting-point material 44,48 is always adjacent to its respective sealing head 62,64. In other words, lower-melting-point material 44,48 is provided in greater widths than any "float" in either lateral direction, so that the sealing heads 62,64 are always adjacent to lower-melting-point material 44,48, melt it, and produce a bond which does not wander longitudinally in a given bag, or from one bag to another.

Stated somewhat differently, the lower-melting point material 44,48 provides selectively placed preferential seal areas. When float or lateral shifting of the profiles occurs, the bond is confined to the preferential seal area. The non-seal areas, defined by portions 46,50, ensure that bonding does not occur in those areas which will adversely effect the pull test requirements for the pouch or package.

For purposes of illustration, reference will now be made to FIGS. 8A, 8B and 8C, which show pull test conditions for measuring the force required to open plastic bags from without, that is, from outside, corresponding to an intentional opening by a consumer. FIGS. 8A, 8B and 8C represent the conditions where the interlocked male and female profiles 20,22 have been attached to the bag walls 12,14, respectively, by passing between sealing heads 62,64 on the left side, center and right side of channel 60 in FIG. 7. In each case, the dashed lines above and below the interlocked male and female zipper profiles 20,22 represent the positions of sealing heads 62,64. As such, FIGS. 8A, 8B and 8C represent the effect of the float of the interlocked male and female zipper profiles 20,22 to the left and to the right within channel 60.

Recalling that sealing head 62 only seals lower-melting-point material 44 to bag wall 12, and that sealing head 64 only seals lower-melting-point material 48 to bag wall 14, it will be readily understood that, when point 72 of bag wall 12 and point 74 of bag wall 14 are pulled apart to conduct the pull test from without, the results are substantially the same for FIGS. 8A, 8B and 8C. That is because, in each case, point 72 pulls the male profile 20 outwardly of its interlocking with female profile 22, while point 74 pulls from behind the interlocking point between the male and female profiles 20,22. In each case, the rounded portion of the arrowhead of male profile 20 simply slips out of the channel in the female profile 22.

In contrast, FIGS. 9A, 9B and 9C show pull test conditions for measuring the force required to open plastic bags from within, that is, from inside the bag, corresponding to an unintentional opening of the bag from inside. Again, the dashed lines above and below the interlocked male and female profiles 20,22 represent the positions of sealing heads 62,64. As such, FIGS. 9A, 9B and 9C represent the effect of the float of the interlocked male and female zipper profiles 20,22 to the left and to the right within channel 60.

Recalling again that sealing head 62 only seals lower-melting-point material 44 to bag wall 12, and that sealing head 64 only seals lower-melting-point material 48 to bag wall 14, it will be readily understood that, when point 82 of bag wall 12 and point 84 of bag wall 14 are pulled apart to conduct the pull test from within a bag, the results are substantially the same for FIGS. 9A, 9B and 9C. That is because, in each case, point 82 pulls the male profile 20 outwardly of its interlocking with female profile 22, while point 84 pulls from behind the interlocking point between the male and female profiles 20,22. In each case, the acute portion of the arrowhead of male profile 20 ensures that it remains locked within the channel in the female profile 22.

Obviously, numerous modifications may be made to this invention without departing from its scope as defined in the appended claims.

What is claimed is:

1. A method for substantially reducing the variance in the forces needed to open reclosable plastic bags from within and from without comprising the steps of:

a) providing a first bag wall and a second bag wall;

b) providing a first zipper member having a male profile and a second zipper member having a female profile, said male profile and said female profile being interlocked with one another;

c) providing a first interlayer and a second interlayer, each of said interlayers being formed at least in part of a strip of material having a lower melting temperature than said zipper members and said bag walls, and having a preselected, constant width;

d) disposing said first interlayer between said first bag wall and said first zipper member;

e) disposing said second interlayer between said second bag wall and said second zipper member, said strip of material having a lower melting temperature being between said female profile of said second zipper member and said second bag wall;

f) providing a first sealing head and a second sealing head;

g) directing said first bag wall, first interlayer, first and second zipper members with respective interlocked male and female profiles, second interlayer and second bag wall along a channel between said first and second sealing heads, said first and second zipper members with respective interlocked male and female profiles being within and guided by said channel, said channel having a width such that any lateral movement of said first and second zipper members therein will be less than said preselected widths of said strips of said first and second interlayers;

h) disposing said first and second sealing heads over said strips in said first and second interlayers, respectively;

i) maintaining said first and second sealing heads at temperatures above the melting temperatures of said strips of material in said first and second interlayers, but below the melting temperatures of said first and second zipper members and said first and second bag walls; and j) sealing said first bag wall to said first zipper member with said strip of said first interlayer, and said second bag wall to said second zipper member with said strip of said second interlayer.

2. A method as claimed in claim 1 wherein said strips of material in said first and second interlayers are of a high EVA material.

3. A method as claimed in claim 1 wherein said strips of material in said first and second interlayers are of a high melt index material.

4. A method as claimed in claim 1 wherein said strips of material in said first and second interlayers are of a thermoplastic olefin (TPO) copolymer.

5. A method as claimed in claim 1 wherein said strips of material in said first and second interlayers are of an ethylene methyl acrylate (EMA) copolymer.

6. A method as claimed in claim 1 wherein said preselected, constant width of said strip of material in said first interlayer is equal to the full width of said first interlayer.

7. A method as claimed in claim 1 wherein said preselected, constant width of said strip of material in said first interlayer is less than the full width of said first interlayer, said strip being parallel to said male profile, whereby said strip in said first interlayer may be parallel to a portion of said first zipper member not sealed to said first bag wall.

8. A method as claimed in claim 1 wherein said preselected, constant width of said strip of material in said second interlayer is equal to the full width of said second interlayer.

9. A method as claimed in claim 1 wherein said preselected, constant width of said strip of material in said second interlayer is less than the full width of said second interlayer, said strip being parallel to said female profile, whereby said strip in said second interlayer may be parallel to a portion of said second zipper member not sealed to said second bag wall.

* * * * *

UNITED STATES PATENT AND TRADEMARK OFFICE
CERTIFICATE OF CORRECTION

PATENT NO. : 5,558,613
DATED : September 24, 1996
INVENTOR(S) : Paul A. Tilman, et al.

It is certified that error appears in the above-indentified patent and that said Letters Patent is hereby corrected as shown below:

On the title page, [Item 73], correct the Assignee to read as follows:

Minigrip, Inc.

Signed and Sealed this

Tenth Day of December, 1996

*Attest:*

BRUCE LEHMAN

*Attesting Officer*     *Commissioner of Patents and Trademarks*